Jan. 19, 1960  E. M. CANNER  2,921,436
REMOTE CONTROLLED COUPLING FOR FLUID LINES
Original Filed Jan. 24, 1956
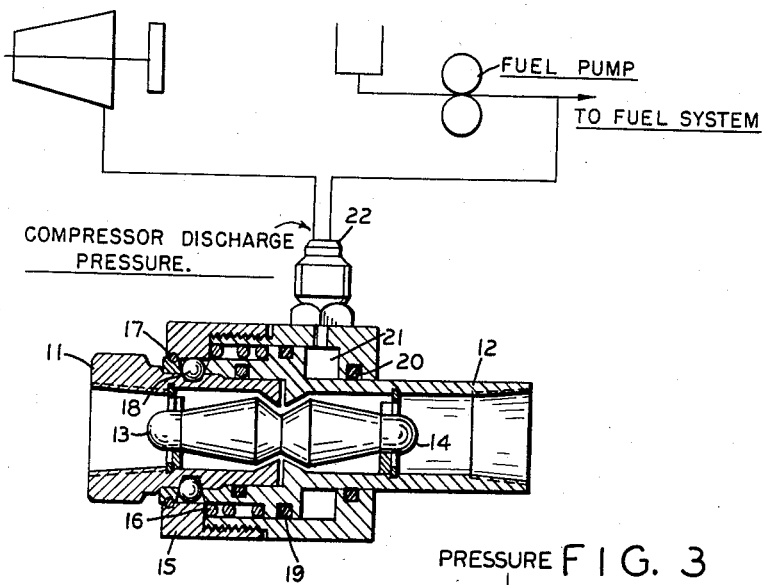
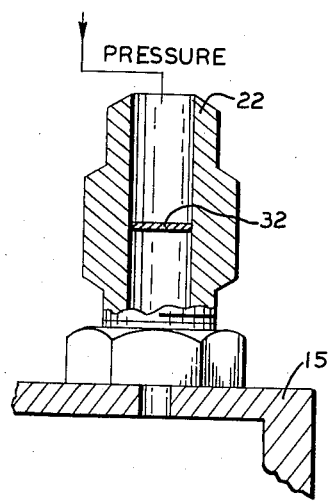
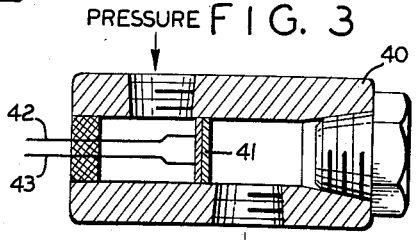
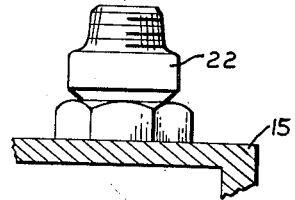
EDWIN M. CANNER
INVENTOR.
BY
Ervin B. Steinberg
AGENT.

United States Patent Office 2,921,436
Patented Jan. 19, 1960

2,921,436

REMOTE CONTROLLED COUPLING FOR FLUID LINES

Edwin M. Canner, West Hartford, Conn., assignor to Kahn and Company, Incorporated, Hartford, Conn., a corporation of Connecticut Original application January 24, 1956, Serial No. 561,027. Divided and this application June 12, 1958, Serial No. 741,677

5 Claims. (Cl. 60—39.14)

This application is a divisional application of copending application for U.S. Letters Patent Serial No. 561,027 filed January 24, 1956.

This invention is related to couplings for fluid lines and has particular reference to quick-connective couplings equipped with automatic shut-off means.

Couplings for fluid lines operating under pressures other than atmospheric pressure and embodying valve means acting automatically to close the line on one or both sides of the coupling when the coupling is broken and to open the line on one or both sides when the coupling is made are well known in the art.

In most couplings of this design a mechanical sleeve or other elements must be moved in order to establish engagement of the coupling halves or cause disengagement therebetween. This motion is usually accomplished manually.

The advent of modern aircraft engines has shown the need for such a coupling which can be disconnected by remote control. Many of the new aircraft engines require starting from an external source of high pressure air. These engines, particularly when mounted in interceptor aircraft, must be ready not only for instant starting, but the aircraft still further must be ready for instant take-off. Since the aircraft although manned, may be independent of ground maintenance crews and as the aircraft may be located a mile or more from the hangers, a means is desired for disconnecting the aircraft by remote control from the source of fluid pressure.

The use of mechanical releases, involving cables, flexible shafts, levers, etc., is well known. These means are however not desirable because usually only one coupling at a time can be actuated. In multi-engine aircraft, disconnecting one coupling at a time is a time consuming operation and burdens the pilot or crew member who is working at this moment at full capacity. Still further, decoupling initiated upon excessive mechanical stress presents obvious safety hazards since it may upset the stabilizing forces of light aircraft and as it is not known whether the connection has been broken until the aircraft has actually started to leave its take-off position.

One of the objects of this invention therefore is to provide a coupling which avoids one or more of the disadvantages of prior art arrangements.

Another object of this invention is the provision of a fluid coupling which can be disconnected in response to the operation of a remote control circuit.

Another object of this invention is to provide a coupling which presents a minimum of safety hazards.

Another object of this invention is the provision of a mechanism in which a plurality of fluid couplings can be disconnected by a single control operation.

Another and further object of this invention is the provision of a fluid coupling which is disconnected by moving a sliding member under the influence of power means controlled from a remote location.

Another and still further object of this invention is the provision of a fluid coupling which is disconnected without time delay and independently of the mechanical skill of an attendant or operator.

One of the features of this invention includes a plug member and a socket member adapted to engage one another and establish fluid flow therebetween. A slidable sleeve is mounted on one of said members which is resiliently biased in one direction to maintain the plug and socket members when engaged in fluid conducting relation. Means provided are coupled to said sleeve to move the sleeve against the biasing means in response to the operation of a remote control circuit.

Another feature includes the provision of fluid pressure means to effect motion of the slidable sleeve.

Further and other features of this invention will become apparent by reference to the following description taken in conjunction with the accompanying drawings in which:

Figure 1 is a cross sectional view (partly schematic) of the fluid coupling including a control circuit;

Figure 2 is a modification of the control circuit shown in Figure 1, and

Figure 3 shows still another modification of the control means for the instant device.

Referring now to Figures 1, 2, and 3, and Figure 1 in particular, a valved coupling for fluid lines is illustrated substantially as shown and described in U.S. Patent 2,548,528 to F. E. Hansen, issued April 10, 1951, entitled "Valved Hose Coupling." Such couplings are well known in the art and essentially comprise a plug member 11 and a socket member 12 adapted to engage one another and conduct fluid under pressure. Each of said members is equipped with a valve mechanism 13 and 14 respectively (shown schematically) which acts automatically to close either side of the line when the coupling is broken and to open the line on both sides when the coupling is made. The details of this mechanism and its related elements have been omitted as they are well known in the art and may be inspected by reference to the above identified patent. Similar couplings are illustrated also in a reference table entitled "Quick Disconnect and Self-Sealing Couplings for Fluid Applications," Product Engineering Magazine, December 1955, pages 168 and 169.

The instant coupling includes also a slidable, annular sleeve 15 (made for the sake of assembling convenience of two threaded halves) which is resiliently biased toward the left by a helical compression spring 16. When the sleeve 15 is moved toward the right, against the force exerted by compression spring 16, the sleeve frees split ring 17 and steel ball 18 lifts out of its seat to cause disconnecting of the coupling halves.

In the instant design, the annular sleeve has been fitted with two O-ring gaskets 19 and 20 to provide a sealed annular chamber 21 which can be pressurized with a fluid entering through fitting 22. When this chamber becomes pressurized, sleeve 15 is urged in motion toward the right thus causing a release of the locking arrangement between the coupling members.

The operational use of the instant coupling may be visualized as follows: Fitting 22 normally is connected to a fluid control circuit while the coupling conducts fluid under pressure through its interior. When sufficient pressure in the control circuit is obtained, this pressure becomes effective via fitting 22 in chamber 21, causing sleeve 15 to move toward the right so as to unlock the coupling members from one another. Simultaneously, the fluid pressure within coupling halves 11 and 12 causes a reaction force which, together with gravity, effects separation of the coupling members.

Figure 1 illustrates a design wherein the coupling members become separated and the pilot is free of any work. Both the compressor discharge pressure and the fuel pressure in a gas turbine of an aircraft are approximately proportional to engine speed. It is possible therefore to connect fitting 22 to these pressures and set up suitable conditions so that at a given speed, let us say the idling speed of the engine, the coupling will automatically be disconnected. This system has the desirable feature of simplicity from the pilot's point of view. During normal ground checking operations, however, a disadvantage becomes evident, because every time the engine is run to speed, the fluid line will disconnect causing some inconvenience to ground personnel. If necessary, this undesirable feature readily can be alleviated by placing a small hand valve in the line whereby the valve can be closed to prevent automatic disconnect. It will be apparent that in the foregoing illustration the right coupling member, being connected to aircraft turbine and fuel pump remains with the aircraft, while the other member stays with the ground fluid pressure system.

Figure 2 shows a variation of the above design. A thin diaphragm 32 is disposed within fitting 22. Whenever the pressure exceeds a predetermined value, the diaphragm ruptures and pressure is admitted to chamber 21. The diaphragm acts therefore like an automatic valve and requires no special control. Obviously, the fitting or diaphragm must be replaced after each use.

Figure 3 illustrates still another modification. The fluid line to fitting 22 is provided with a control valve 40 which contains a squib 41 which may be fired by energizing conductors 42 and 43. Normally, the valve is closed, being blocked by squib 41. When sending an electrical signal via conductors 42 and 43, the squib explodes, admitting pressure to chamber 21.

It will be apparent that many other control valve means may be employed without deviating from the principles described hereinbefore. Such valves may be fluid operated valves, motor actuated valves, solenoid operated valves, etc. all of which could be used to admit pressure from a control circuit to chamber 21. In all these cases however, the combination of a control fluid pressure and the fluid pressure within the coupling will cause separation of the coupling members.

While there have been described certain embodiments of the present invention, it will be apparent to those skilled in the art that many other modifications and changes may be made without deviating from the principle and intent of the invention which shall be limited only by the scope of the appended claims.

What is claimed is:

1. A remote controlled coupling for fluid lines in combination with a vehicle having a propelling engine including a fluid pressure system comprising; a plug member and a socket member adapted to engage one another and establish flow of fluid under pressure therebetween; a slidable element supported on one of said members; locking means cooperating with said plug and socket members and said slidable element to maintain said plug and socket members when engaged in fluid conducting relation while said slidable element is in a first position relative to said members; resilient means biasing said element toward said first position to maintain said members engaged; fluid pressure means coupled to said element to move it against the biasing means in response to the force of said fluid pressure thereby freeing said locking means and permitting separation of said members and said fluid pressure means being in communication with the engine fluid pressure system.

2. A remote controlled coupling for fluid lines in combination with a vehicle having a propelling engine including a fluid pressure system comprising: a plug member and a socket member adapted to engage one another and establish flow of fluid under pressure therebetween; a sleeve supported on one of said members; locking means cooperating with said plug and socket members and said sleeve to maintain said plug and socket members when engaged in fluid conducting relation while said sleeve is in a first position relative to said members; resilient means biasing said sleeve toward said first position to maintain said members engaged; fluid pressure means coupled to said sleeve to move it against the biasing means in response to the force of said fluid pressure thereby freeing said locking means and permitting separation of said members, and said fluid pressure means being in communication with the engine fluid pressure system.

3. A remote controlled coupling for fluid lines in combination with a vehicle having a propelling engine including a fluid pressure system comprising; a plug member and a socket member adapted to engage one another and establish flow of fluid under pressure therebetween; a slidable element supported on one of said members; locking means cooperating with said plug and socket members and said slidable element to maintain said plug and socket members when engaged in fluid conducting relation while said slidable element is in a first position relative to said members; spring means biasing said element toward said first position to maintain said members engaged; fluid pressure means coupled to said element to move it against the biasing means in response to the force of said fluid pressure thereby freeing said locking means and permitting separation of said members, and said fluid pressure means being in communication with the engine fluid pressure system.

4. A remote controlled coupling for fluid lines in combination with a vehicle having a propelling engine including a fluid pressure system comprising; a plug member and a socket member adapted to engage one another and establish flow of fluid under pressure therebetween; a slidable element supported on one of said members; locking means cooperating with said plug and socket members and said slidable element to maintain said plug and socket members when engaged in fluid conducting relation while said slidable element is in a first position relative to said members; resilient means biasing said element toward said first position to maintain said members engaged; fluid pressure means coupled to said element to move it against the biasing means in response to the force of said fluid pressure thereby freeing said locking means and permitting separation of said members, said fluid pressure means being in communication with the engine fluid pressure system, and fluid flow control means disposed for controlling the fluid pressure to said element.

5. A remote controlled coupling for fluid lines in combination with a vehicle having a propelling engine including a fluid pressure system comprising; a plug member and a socket member adapted to engage one another and establish flow of fluid under pressure therebetween; a slidable element supported on one of said members; locking means cooperating with said plug and socket members and said slidable element to maintain said plug and socket members when engaged in fluid conducting relation while said slidable element is in a first position relative to said members; resilient means biasing said element toward said first position to maintain said members engaged; a portion of said element forming with a portion of one of said members a chamber which is adapted to become pressurized with fluid; fluid pressure means coupled to said chamber to cause motion of said element against the biasing means in response to the force of said fluid pressure thereby freeing said locking means and permitting separation of said members, and said fluid pressure means being in communication with the engine fluid pressure system.

References Cited in the file of this patent

UNITED STATES PATENTS

| | | |
|---|---|---|
| 2,387,126 | Dillon | Oct. 16, 1945 |
| 2,548,528 | Hansen | Apr. 10, 1951 |
| 2,698,185 | Sloan | Dec. 28, 1954 |
| 2,752,801 | Olson | July 3, 1956 |
| 2,782,044 | Gabriel et al. | Feb. 19, 1957 |